United States Patent [19]
Mottram

[11] Patent Number: 5,813,541
[45] Date of Patent: Sep. 29, 1998

[54] VERSATILE MOUNTING FOR CONTROL CONSOLE FOR TESTING CHAMBER

[75] Inventor: Norman J. Mottram, Niwot, Colo.

[73] Assignee: QualMark Corporation, Westminster, Colo.

[21] Appl. No.: 838,400

[22] Filed: Apr. 7, 1997

Related U.S. Application Data

[63] Continuation of Ser. No. 432,451, May 19, 1995, abandoned.

[51] Int. Cl.⁶ .......................................................... B03B 9/00
[52] U.S. Cl. .............................. 209/2; 209/3.1; 209/552; 209/571
[58] Field of Search ................................ 209/3, 3.1, 2, 1, 209/10, 11, 552, 556, 571, 702, 942; 73/865.6, 865.9, 571, 663; 248/276.1, 282.1, 289.11, 622, 634, 632; 374/45, 46, 57

[56] References Cited

U.S. PATENT DOCUMENTS

| | | | |
|---|---|---|---|
| 3,478,876 | 11/1969 | Littwin et al. | 209/73 |
| 4,185,801 | 1/1980 | Plymoth | 248/289 |
| 4,239,434 | 12/1980 | Gannon | 414/136 |
| 4,319,314 | 3/1982 | Morton | 362/432 |
| 4,856,741 | 8/1989 | Schaefer | 248/122 |
| 4,869,813 | 9/1989 | Bailey et al. | 209/538 |
| 5,039,228 | 8/1991 | Chalmers | 374/57 |
| 5,299,693 | 4/1994 | Ubaldi et al. | 209/3.3 |
| 5,365,788 | 11/1994 | Hobbs | 73/665 |
| 5,379,205 | 1/1995 | Peng | 362/430 |
| 5,412,991 | 5/1995 | Hobbs | 73/663 |
| 5,540,109 | 7/1996 | Hobbs | 73/865.6 |

*Primary Examiner*—David H. Bollinger
*Attorney, Agent, or Firm*—James B. Young; Scott B. Allison; Chrisman, Bynum & Johnson P.C.

[57] ABSTRACT

A screening apparatus including a testing chamber and a control console for environmental screening and vibrational testing of manufactured products placed inside the testing chamber. The control console is used to control and monitor the operation of the screening apparatus. The control console is supported on an articulated arm so that the control console can be optimally positioned. The articulated arm also protects the control console from the thermal and vibrational stimuli applied to the product being tested. The system wiring between the testing chamber and the control console can be enclosed in or attached to the articulated arm so that the wires do not impede the mobility of the articulated arm and do not pose a hazard to people working near the screening apparatus. Optional rigid bars can be placed with the walls of the testing chamber to increase the resonance frequency of the testing chamber to further protect the control console from the vibrational stimuli applied to the product being tested. In a second embodiment, the control console is in a free standing and optionally mobile rack and the control console is not mechanically connected to the testing chamber. The wires connecting the control console and the testing chamber are held off the floor by a flexible extension extending upward from the control console.

26 Claims, 5 Drawing Sheets

VERSATILE MOUNTING FOR CONTROL CONSOLE FOR TESTING CHAMBER

CROSS-REFERENCE TO RELATED PATENT APPLICATIONS

This patent application is a continuation of U.S. patent application, Ser. No. 08/432,451, entitled Versatile Mounting for Control Console for Testing Chamber, filed May 1, 1995 now abandoned.

BACKGROUND OF THE INVENTION

1. Field of the Invention

The present invention relates generally to a screening apparatus used for environmental screening and vibrational testing of manufactured products. More particularly, the present invention relates to means for insulating and protecting the console controlling the screening apparatus from the thermal and vibrational stimuli applied to the product being tested, and to means for increasing the safety of the screening apparatus and the visibility of the product being tested.

2. Description of the Prior Art

Electronic products, such as circuit boards and electrical components, are often tested or "screened" for latent defects in soldered connections, conductor weaknesses and discontinuities, component defects, material defects, short circuits, fragility, and the like, by subjecting the products to thermal and vibrational stimuli, such as rapid temperature variations and vibrations in multiple frequencies and directions. Other stresses such as electric power cycling, voltage changes, and input power frequency variations may be introduced to the products being screened, and in some screening systems, the products can be monitored visually and electronically to determine if the products function and continue to function as expected.

It is also helpful to connect the circuit boards to electronic testing equipment that can cause each of the electronic components on the circuit board to perform its intended function as the same time as it is being exposed to varying temperature and vibrational stimuli in order to pin point the root cause of failures in the circuit board. Corrective action can then be implemented to remedy the cause of latent defects uncovered during the screening before the products are distributed to customers. Such environmental screening can lead to significant product quality improvements, production cost reductions, reduced warranty repair expense, increased customer satisfaction, and increased market share.

Existing screening techniques utilize temperature cycling within a testing chamber which, in more advanced cases, also has a vibrating table or mechanism within it. Due to the harsh environmental and vibrational stresses applied to the product during testing, the product or portions of the product may melt, vaporize, explode, rupture, shatter, disintegrate, deteriorate, or suffer some other physical change or condition. These physical changes or conditions and the rates of progression of such changes or conditions may not be monitorable by the control console, because of instrumentation limitations. Therefore, direct visual observation by the user by a camera may be more effective, particularly if a visual record of the progression of the physical changes is needed. The control console for many testing chambers are usually attached directly to the testing chamber for convenience and packaging. However, when the control console is attached in a fixed position to the testing chamber, it may be difficult to observe the product being testing in the testing chamber and to use the control console while simultaneously using or monitoring other equipment located near the testing chamber. Therefore, it would be helpful to have a control console that can be positioned in a variety of locations to provide visual access from multiple perspectives to the product being tested.

During the testing of a product in a testing chamber, the product may be subjected to extreme and varying environmental and vibrational conditions. For example, it is possible to generate temperatures as high as two hundred degrees celsius (200° C.) or higher and temperatures as low as minus one hundred degrees (−100° C.) or lower in the testing chamber when testing the product. The temperature levels within the testing, chamber can be maintained for long periods of time, for example, two to three days or longer. In addition, the temperature within the testing chamber may be repeatedly cycled between different and varying temperature levels, which can include the temperature levels discussed above. It is also possible that the temperature variations within the testing chamber may be cycled up and down at a rapid rate, for example, at a rate of sixty degrees celsius (60° C.) per minute.

Along, with the environmental conditions discussed above, it is also possible to generate mechanical vibrations as high as, for example, seventy (70) G-RMS in the frequency range of two thousand (2,000) to ten thousand (10,000) hertz, in the testing chamber and the product being tested. G is a unit of acceleration equal to the standard acceleration of gravity, that is, 9,80655 meters per second per second. C-RMS is the root-mean-square value of G. The mechanical vibrations within the testing chamber can be maintained for long periods of time, for example, two to three days or longer. In addition, the level of the vibration within the testing chamber may be repeatedly cycled or modulated between different and varying levels. It is also possible that the variations of the vibrations within the testing chamber may be cycled up and down almost instantaneously at a rapid rate, for example, at a rate of seventy (70) G per minute. In more sophisticated testing chambers, the mechanical vibrations may be directed simultaneously in all translations and rotations, and may have a broad spectrum of frequencies.

The high and low temperature levels, the temperature transition variations, and the rate of change of the temperature variations, if thermally transmitted to the control console, can effect, damage, or even destroy the control logic, control switches, electronic circuitry, and electronic components located in the control console. In addition, the mechanical vibrations, the broad spectrum of the frequency of the vibrations, and the rate of change of the level of the vibrations, if transmitted to the control console, can also effect, damage, or destroy the control logic, control switches, electronic circuitry, and electronic components located in the control console.

The damaged electrical and mechanical components of the control console may be expensive, time consuming, or difficult to replace. A damaged console significantly reduces the operation and usefulness of the screening apparatus. In addition, a failure in the control console may result in thermal or vibrational "runaway," that is, the thermal or vibrational stimuli applied to the product being tested increases uncontrollably beyond any conditions it is likely to encounter in normal use, resulting in unnecessary damage or destruction of the product. Furthermore, reducing the amount of thermal and vibrational stimuli applied the product so as to protect the control console reduces the usefulness of the screening apparatus. Therefore, it is desirable to have a screening apparatus where the environmental and vibrational stimuli applied to the product being tested is not imparted to the control console.

An additional problem created by the mechanical vibrations involves the resonance frequency of the screening apparatus. Every object, including the screening apparatus, has a resonance frequency, the frequency at which additional stimulating energy adds constructively to vibrational energy already in the object, such that the object will vibrate at higher and higher amplitude when driven or struck by additional external forces. In other words, if an object is driven or struck by an external force having a frequency equal to, and in phase with, the resonance frequency of the object the amplitude or strength of the resonance frequency vibrations steadily increases. If the amplitude or strength of the vibrations is not stopped or reduced (damped), they may increase until the object begins to disintegrate or fall apart. Mechanical vibrations can be generated in the testing chamber by the vibrating table, the thermal system, the air circulation system, and other components of the screening apparatus. If the mechanical vibrations generated in the testing chamber include frequencies near or equal to the resonance frequency of the screening apparatus, or any component of the screening apparatus, including the control console, the screening apparatus or the components of the screening apparatus may become damaged or destroyed. In addition, a potentially dangerous condition may exist if the control console is damaged or destroyed so as to prevent the safe operation and shut down of the screening apparatus. While the frequencies of the vibrational stimuli applied the product can be limited so as to protect the control console from the problem created to the resonance frequency of the screening apparatus, this reduces the usefulness of the screening apparatus. Therefore, it is desirable to raise the resonance frequency of the screening apparatus as high as possible.

If the control console is free-standing, remotely connected to the testing chamber, and optionally mobile, the wires interconnecting the control console and the testing chamber often lie on the floor, which makes it difficult to walk around the testing chamber and the free-standing console. In addition, the wires laying on the floor can be damaged by people stepping on them or by equipment such as forklifts running over them. The wires can also be damaged by being dragged across the floor and against other equipment when the free-standing console is repositioned. More importantly, a potentially dangerous working environment for users can be created if the damaged wires become exposed.

SUMMARY OF THE INVENTION

General objectives of the present invention are to facilitate and enhance environmental testing of products and devices under predetermined testing conditions, to make environmental testing more efficient and more safe, to improve the visibility of the product being tested while enhancing access to the controls, to reduce the potential for damage to the screening apparatus, and to insulate and protect the console controlling the screening, apparatus from the thermal and vibrational stimuli applied to the product being tested.

Additional objects, advantages, and novel features of the invention shall be set forth in part in the description that follows, and in part will become apparent to those skilled in the art upon examination of the following or may be learned by the practice of the invention. The objects and the advantages may be realized and attained by means of the instrumentalities and in combinations particularly pointed out in the appended claims.

To achieve the foregoing and other objects and in accordance with the purposes of the present invention, as embodied and broadly described therein, the screening apparatus according to this invention includes an adjustable and manipulatable arm connected to a testing chamber on one end and to a control console on the opposite end, where the arm extends outward from the chamber. Optional rigid bars can be placed within the walls of the testing chamber to increase the rigidity of the testing chamber and to enhance mounting integrity for the console. Other features of the invention are described and claimed in more detail below. In a second embodiment of the present invention, the control console is in a free standing and optionally mobile rack and the control console is not mechanically connected to the testing chamber. The wires connecting the control console and the testing chamber are held off the floor by a flexible extension extending upward from the control console.

BRIEF DESCRIPTION OF THE DRAWINGS

The accompanying drawings, which are incorporated in and form a part of the specifications, illustrate the preferred embodiments of the present invention, and together with the descriptions serve to explain the principles of the invention.

In the Drawings

DETAILED DESCRIPTION OF THE PREFERRED EMBODIMENTS

The screening apparatus 10 of the present invention shown in FIGS. 1–5 includes a chamber 12 for applying thermal, electrical, and vibrational stimuli to a product 13 positioned inside the chamber 12, a control console 14 for controlling and monitoring the operation of the screening apparatus 10, and an articulated arm 16 for attaching the control console 16 to the chamber 12.

The chamber 12 includes two doors 18, 20 that are connected by hinges 22, 22', 24 respectively to chamber back wall 26. The doors 18, 20 can rotate about hinges 22, 22', 24 respectively to allow the doors 18, 20 to open to positions 18', 20' (see FIG. 3) respectively so as to allow the user to gain access to the internal area 21 of the chamber 12 and to the product 13. The door 18 can include an optional window 28 (see FIGS. 1 and 5) to allow viewing and visual monitoring of the product 13 being tested inside the chamber 12. Likewise, the door 20 can include a window 29 (see FIG. 5) to allow viewing and visual monitoring of the product 13 being tested inside the chamber 12. The chamber front wall 30 can also include a optional window 32 (see FIG. 2) to allow viewing and visual monitoring of the product 13 being testing inside the chamber 12.

The chamber 12 can be equipped with temperature control apparatus, such as a heating device (not shown) and/or a cooling device (not shown). The chamber 12 can also have a circulating fan 33 (see FIG. 5) or other means (not shown) to control the exchange of thermal energy with the product 13 that is being tested. Furthermore, the chamber 12 can include a vibrating table 35 (see FIG. 5) to expose the product 13 being tested to vibrational stresses. The use of a chamber 12 to apply thermal, electrical, and vibrational stimuli to a product 13 is well known to people having ordinary skill in the art and need not be described in any further detail. For example, devices suitable for use with the present invention are shown in U.S. Pat. No. 5,365,788 issued to Hobbs, U.S. Pat. No. 5,195,385 issued to Duesler, Jr., et al., and U.S. Pat. No. 5,039,228 issued to Chalmers, the disclosures of all three of which are herein incorporated by reference. In addition, devices suitable for use with the present invention are shown in U.S. application Ser. No. 08/097,282 (currently scheduled to issue on May 9, 1995, as U.S. Pat. No. 5,412,991), by Gregg K. Hobbs, and in U.S. Pat. No. 5,540,109 issued to Gregg K. Hobbs, the disclosures of both of which are herein incorporated by reference.

Figure 1:
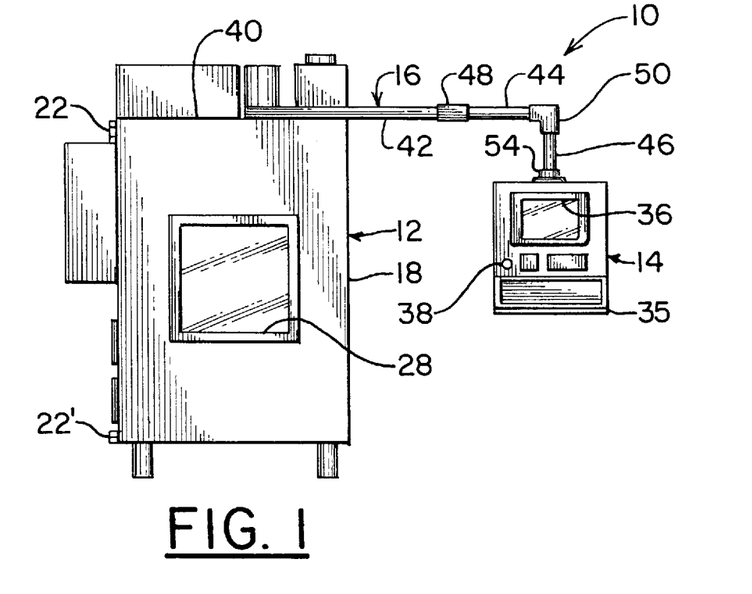
FIG. 1 is a front elevation view of the screening apparatus of the present invention, including a testing chamber, a console, and an articulated arm.

Now referring to FIG. 1, the control console 14 can include a computer (not shown), a keyboard 34, a visual display 36, an emergency stop button 38, a computer mouse (not shown), a track ball (not shown), a hard disk drive (not shown), a floppy disk drive (not shown), a bar code reader (not shown), and other computer and control features. The control console 14 is used for entering commands, instructions, and programs to control and supervise the screening apparatus 10. More specifically, the control console 14 comprises control switches, control logic, electronic circuitry, and monitoring devices necessary to supervise, control, and monitor the operation of the screening apparatus. For example, the control console 14 can be used to start and stop the screening apparatus 10, to control the testing chamber 12 so that certain sequences of thermal and vibrational stimuli are applied to the product 13 being tested, to store information about the product 13 being tested, to store operating programs and instructions, and to record data generated during the operation of the screening apparatus 10. The product information may include a tracking number for the particular product 13, product type information which corresponds to a predetermined testing sequence stored in the control console 14, or other pertinent information. A pre-programmed testing sequence might be initiated upon detection by the bar code reader (not shown) of the bar code (not shown) imprinted on the product 13 which may correspond to a preprogrammed testing sequence.

The control console 14 can also be used to monitor, record, and visually display the operating characteristics of the chamber 12 and the thermal and vibrational stimuli being applied to the product 13. For example, the temperature inside the chamber 12 and the frequency of the vibrations imparted to the product 13 being tested can be displayed on the visual display 36 or recorded on the hard disk drive (not shown). The use of a control console 14 is well known to people having ordinary skill in the art and the details of the control console 14 need not be described in any further detail.

Figure 2:
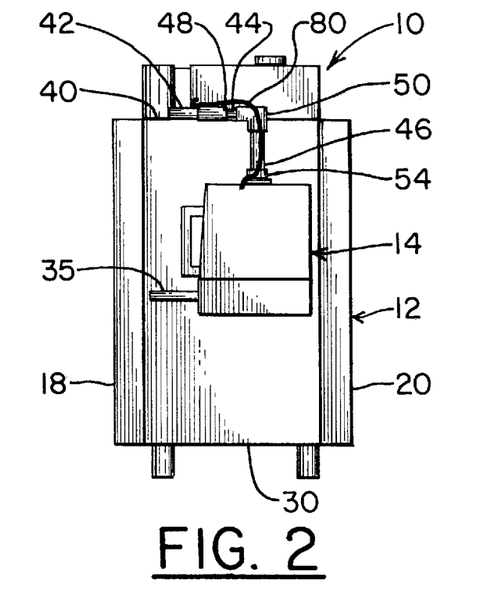
FIG. 2 is a side elevation view of the screening apparatus of the present invention shown in FIG. 1, including a testing chamber, a console, and an articulated arm.
Figure 3:
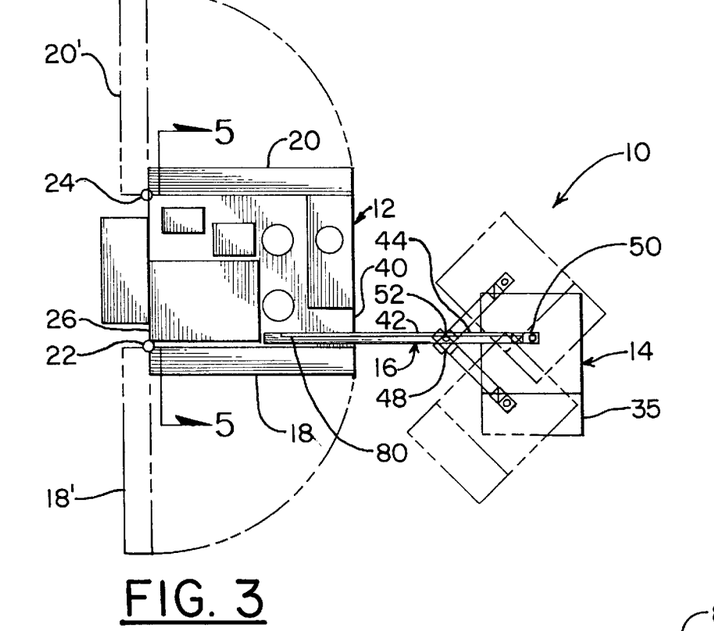
FIG. 3 is a top plan view of the screening apparatus of the present invention shown in FIG. 1, including a testing chamber, a console, and an articulated arm.
Figure 4:
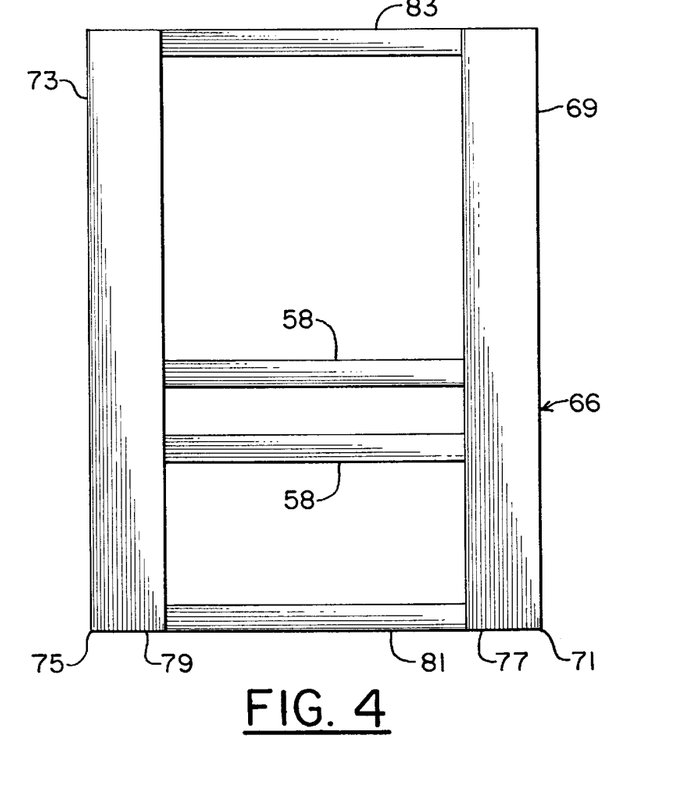
FIG. 4 is an top view of the frame structure of the testing chamber of the apparatus of the present invention shown in FIG. 1.
Figure 5:
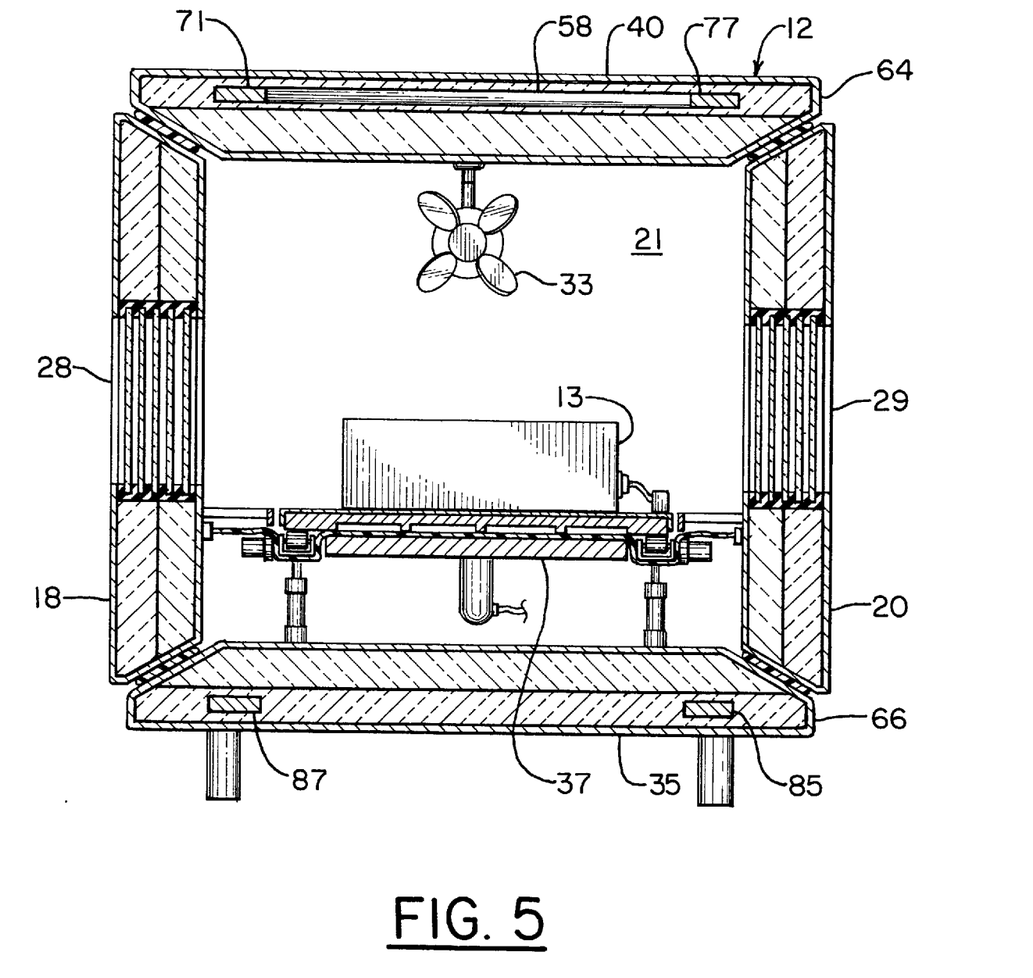
FIG. 5 is an enlarged vertical fragmentary section taken along line 5—5 of FIG. 3, showing the inside of the testing chamber of the apparatus of the present invention shown in FIG. 1.

A significant feature of this invention includes the articulated arm 16 which connects the control console 14 to the chamber 12, as shown in FIGS. 1, 2, and 3. The articulated arm 16 extends outward from the top surface 40 of the chamber 12. The articulated arm 16 includes arm section 42, arm section 44, arm section 46, arm joint 48, and arm joint 50, as shown in FIGS. 1 and 2. The arm section 42 is attached to the top surface 40 of the chamber 12 by welding, bolting, or other suitable means so that the arm section 42 extends outward, preferably horizontal, from the chamber 12.

Figure 8:
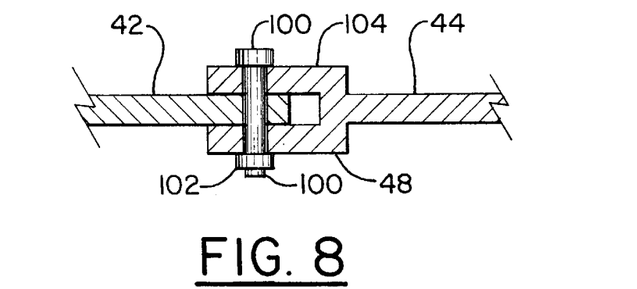
FIG. 8 is a side view showing the inside of a pivot joint in the articulated arm of the apparatus of the present invention shown in FIG. 1.

The arm section 42 is connected to the arm section 44 at the arm joint 48. The arm joint 48 contains a pivot bolt 100 (see FIG. 8). The pivot bolt 100 and the pivot nut 102 are detachably threaded together and connect arm section 42 to the U-shaped end 104 of arm section 44 to allow the arm section 44 to rotate about the pivot bolt 100 and the joint center point 52 (see FIG. 3) in a horizontal plane, as shown in FIG. 3. This enables the control console 14 to have a variety of positions relative to the chamber 12.

Figure 9:
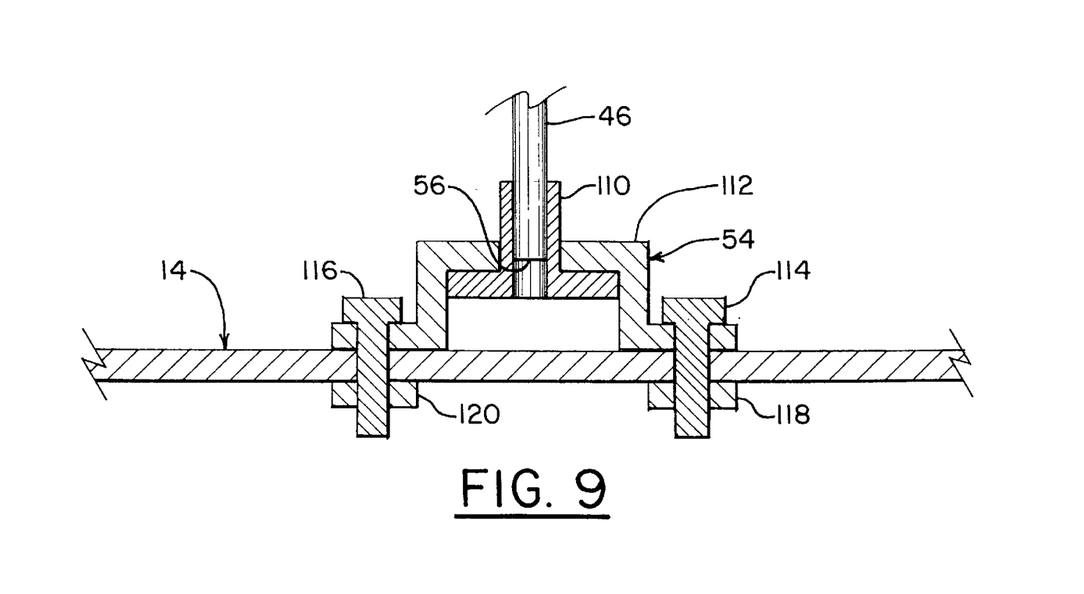
FIG. 9 is a side view showing the inside of a second pivot-joint in the articulated arm of the apparatus of the present invention shown in FIG. 1.

The arm section 44 is rigidly connected by welding, bolting, etc. to the arm section 46 at the arm joint 50, as shown in FIGS. 1 and 2. The arm section 46 extends vertically downward from the arm joint 50. The arm section 46 is connected to the control console 14 at the joint 54, as shown in FIG. 1 and 2. The control console 14 can also rotate about the end 56 of the arm section 46 at the joint 54 (see FIG. 9), which increases the number of possible positions of the control console 14 in relation to the chamber 12. The end 56 of arm section 46 is connected by welding or other suitable process to flange 110. The flange 110 is free to rotate inside the flange 112. The flange 112 is rigidly connected to the console 14 by bolts 14 and 116 which are connected to nuts 18 and 120 respectively.

Other pivot or rotation joints (not shown) and other arm sections (not shown) can be used with the articulated arm 16 concept discussed above to further increase the number of possible positions of the control console 14 in relation to the chamber 12, including joints (not shown) that allow rotation in horizontal and/or vertical planes. In addition, the articulated arm 16 can be attached to a rotation joint (not shown) on the top surface 40 of the chamber 12 so that the entire articulated arm 16 is rotatable about the rotation joint (not shown).

Suspending the control console 14 away from the chamber 12 with the articulated arm 16, as opposed to directly attaching the control console 14 to the chamber 12, decreases heat transfer area and extends the heat transfer path between the chamber 12 and the control console 14, which effectively thermally isolates the control console 14 from the chamber 12, thereby reducing the transmission of the thermal energy from the chamber 12 to the control console 14. The thermal transfer can also be inhibited if the articulated arm 16 is composed of a thermally insulating material, for example, titanium. In addition, since the control console 14 is not directly attached to the chamber 12, more of the exterior surface area of the control console and the articulated arm 16 are exposed to the circulating air in the room where the screening apparatus 10 is being used. The circulating air can help maintain the articulated arm 16 and the control console 14 closer to the ambient temperature, regardless of the temperature levels generated within the chamber 112.

Suspending the control console 14 away from the chamber 12 with the articulated arm 16, as opposed to directly attaching the control console 14 to the chamber 12, also mechanically insulates the control console 14 from the chamber 12, thereby reducing the direct transmission of mechanical vibrations from the chamber 12 to the control console 14. The articulated arm 16 while sufficiently rigid to support the control console 14, is also flexible enough to also reduce the transmission of mechanical vibrations from the chamber 12 to the control console 14 by attenuating or reducing the strength of the vibrations before they reach the control console 14. The pivotal joints 48, 54 also break direct vibrational translation paths in the articulated arm 16, and thus help to attenuate vibrational energy. As a result of the mechanical and thermal isolation of the control console 14 from the chamber 12, the potential damage to the control logic, control switches, electronic circuitry, and electronic components located in the control console 14 is significantly reduced.

If the control console 14 is electrically connected to the chamber 12 by wires 80 (shown in FIGS. 2 and 3, the wires 80 can be enclosed in or attached to the articulated arm 16. Having the wires 80 raised above the floor reduces the impedances to mobility the user may encounter around the screening apparatus 10. The control console 14 and the articulated arm 16 can be repositioned without disconnecting or rearranging any of the wires 80. In addition, having the wires 80 raised above the floor reduces the potential for damage to the wires 80 by people stepping on the wires 80, equipment (not shown) running over, or being placed on, the wires 80, or by having the wires 80 dragged across the floor or against other equipment (not shown).

Suspending the control console 14 with the articulated arm 16 allows the operator to position himself or herself to maximize the visibility of the product 13 being testing and the visibility of the interior area 21 of the chamber 12, while also maintaining optimum visual and manual contact with the control console 14. As previously discussed, it is important to be able to visually monitor the product 13 during the testing process. Fixing the location of the control console 14 in one location might makes it difficult to see the control console 14, the product 13 being tested, and other equipment (not shown) simultaneously because different devices under test can require different perspective angles to observe the test results adequately. Suspending the control console 14 away from the chamber 12, instead of directly attaching the control console 14 to the chamber 12, increases the capability of the chamber 12 to include windows, such as windows 28, 29, and 32, thereby increasing the capability to visually monitor the product 13 being tested and the internal area 21 of the chamber 12. Furthermore, the control console 14 can be positioned to provide access to the control console 14 and simultaneous viewing of other equipment (not shown) or the product 113 being tested. The control console 14 can be repositioned during use of the screening apparatus 10 so that the control console 14 and other equipment (not shown) can be viewed simultaneously. The control console 14 can also be repositioned during use of the screening apparatus 10 so that the product 13 being tested can be viewed by the user at different times through the different windows 28, 29, 32 while providing simultaneous physical and visual access for the user to the control console 14. The ability to maintain physical access to the control console 14 can be very important when, for example, the emergency stop button 38 must be pressed to quickly stop the operation of the screening apparatus 10. When the test is completed, the articulated arm 16 also allows the console 14 to be moved out of the way while the doors of the chamber are opened and products removed or replaced with other products to be tested.

Figure 6:
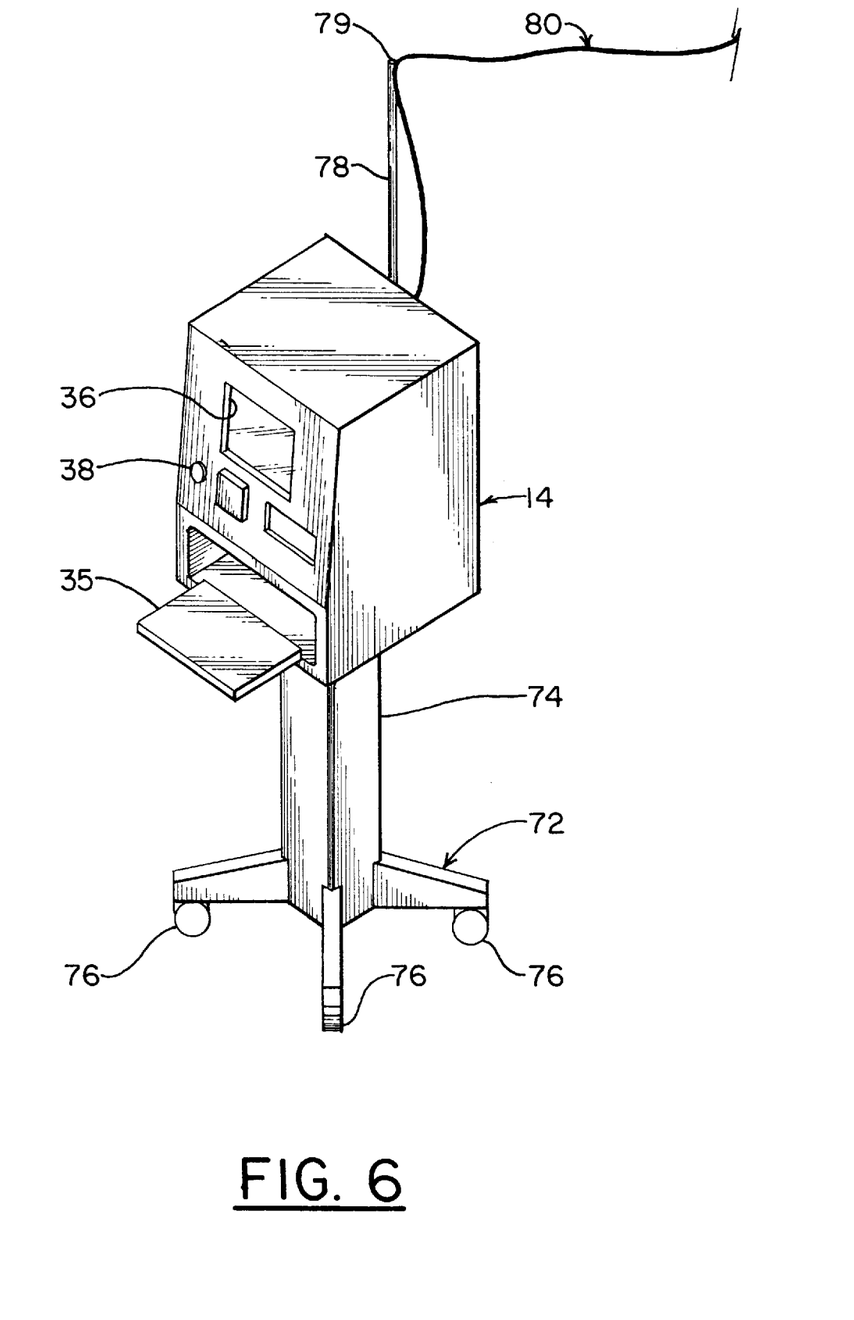
FIG. 6 is an isometric view of a console rack and console used in the second embodiment of the present invention shown in FIG. 1.

In a second embodiment of this invention, the articulated arm 16 is not used. Instead, a free standing control console rack 72 is used, as shown in FIG. 6. The control console rack 72 includes the control console 14 and a stand 74. The optional rollers 76 located on the stand 74 allow the control console rack 72 to be mobile. The control console rack 72 also includes a flexible support 78 to support the wires 80 running between the control console 14 and the top surface 40 of the chamber 12. The flexible support 78 can be composed of wood, plastic, metal, or other flexible material, and has a generally cylindrical or antenna-like shape. The flexible support 78 is rigid enough to remain substantially upright despite the weight of the wires 80 and is also flexible enough to bend slightly so that the force on the end 79 of the flexible support 78 caused by tension from the wires 80 will not break the flexible support 78 or cause the flexible support 78 to break away from the control console rack 72.

In the second embodiment, the control console 14 is remotely isolated from the chamber 12 and, therefore, the control console 14 is well isolated and insulated from the thermal and vibrational stimuli applied to the product 13 in the chamber 12. The flexible support 78 allows the control console rack 72 to be mobile so as to allow optimal viewing of the product 13, the chamber 12, and the other equipment (not shown) being used near the screening apparatus 10. As with the articulated arm 16, the flexible support 78 lifts the wires 80 high off of the surface supporting the screening apparatus 10 to protect the wires 80 and users of the screening apparatus 10. A second flexible support (not shown) can be attached to the chamber 12 to increase the mobility of the control console rack 72 or to lift the wires 80 off of the top surface 40 of the chamber 12.

Figure 7:
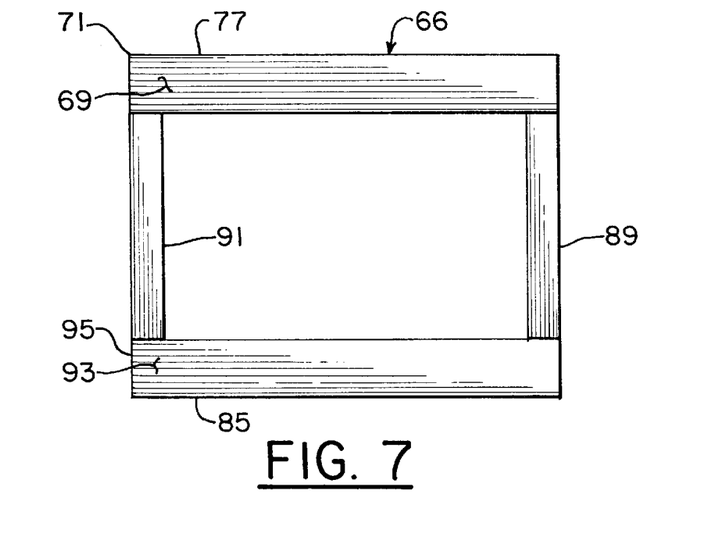
FIG. 7 is a side view of the frame structure of the testing chamber of the present invention shown in FIG. 1.

Another significant feature of this invention includes the rigid attenuating bars 58 (see FIGS. 4 and 5) to reduce the mechanical vibrations imparted to the control console 14. The rigid attenuating bars 58, which are preferably tubular with a hollow circular cross-section, are located in the top layer 64 (see FIG. 5) of the chamber 12 and form part of the rigid frame 66 of the screening apparatus 10 (see FIG. 4). The rigid frame 66 has a generally box-like shape and provides structural support for the entire screening apparatus 10, including the top layer 64, the bottom layer 35, the side layers (not shown) and the chamber doors 18, 20 (not shown in FIG. 4). The chamber door 18 (not shown in FIG. 4) is attached to the surface 69 of rigid frame 66 at approximately edge 71 and to the surface 93 at approximately edge 95 (see FIG. 7) of rigid frame 66. Likewise, the chamber door 20 (not shown in FIG. 4) is attached to the surface 73 of rigid frame 66 at approximately edge 75. The rigid frame 66 includes two longitudinal supports 77, 79 rigidly connected by perpendicular supports 81, 83. The bottom layer 35 also includes a set of longitudinal supports 85, 87 (see FIG. 5) and a set of perpendicular supports (not shown). The longitudinal support 77 in the top layer 64 and the longitudinal support 85 in the bottom layer 35 are rigidly connected by vertical supports 89, 91 (see FIG. 7). Likewise, the longitudinal support 79 in the top layer 64 and the longitudinal support 87 in the bottom layer 35 are rigidly connected by vertical supports (not shown).

A tubular shape with a hollow circular cross-section is preferred for the rigid attenuating bars 58 because this configuration has inherent mechanical strength. The rigid attenuating bars 58 increase the rigidity of the chamber 12 and the screening apparatus 10, thereby raising the resonance frequency of the entire screening apparatus 10. Using the rigid attenuating bars 58 can allow the resonance frequency of the entire screening apparatus 10 to be raised above the frequencies created in the chamber 12 by the vibrating table 37. Therefore, the screening apparatus 10 and, more importantly, the control console 14, will be better protected and less likely to suffer damage from the mechanical vibrations created in the chamber 12. While the previous discussion has focused solely on the two rigid attenuating bars 58 located in the top layer 64 of the chamber 12 more attenuating bars (not shown) can be used in the top layer 64 to connect longitudinal supports 77 and 73, in the bottom layer 35 to connect longitudinal supports 85 and 87, the side layer (not shown) to connect longitudinal supports 77 and 85, the side layer (not shown) to connect longitudinal supports 73 and 87, and in the chamber doors 18, 20 to further increase the rigidity of the frame 66, the rigidity of the screening apparatus 10, and the resonance frequency of the screening apparatus 10.

The foregoing description is considered as illustrative only of the principles of the invention. Furthermore, since numerous modifications and changes will readily occur to those skilled in the art, it is not desired to limit the invention to the exact construction and process shown as described above. Accordingly, all suitable modifications and equivalents may be resorted to falling within the scope of the invention as defined by the claims which follow.

The embodiments of the invention in which an exclusive property or privilege is claimed are defined as follows:

1. A screening apparatus for subjecting a product to varying environmental conditions, comprising:
    an enclosed screening chamber that is isolated environmentally from an ambient environment by top, bottom, and side walls and capable of producing a unique temperature environment within said enclosed screening chamber, wherein the product is positioned within said screening chamber when the product is subjected to the varying environmental conditions;
    a console electrically connected to said screening chamber for supervising the screening apparatus; and
    an arm having a proximal end and a distal end, wherein said proximal end is unrotatably connected to said screening chamber, said arm extends outwardly from said screening chamber, and said distal end is connected to said console.

2. The screening apparatus of claim 1, wherein said arm includes a first section connected to said screening chamber and a second section pivotably connected to said first section.

3. The screening apparatus of claim 2, wherein said console is rotatably connected to said distal end of the said arm.

4. The screening apparatus of claim 1, wherein said arm is hollow.

5. The screening apparatus of claim 1, wherein said screening chamber includes a top surface and said proximal end of said arm is connected to said top surface of said screening chamber.

6. The screening apparatus of claim 5, wherein said arm includes a first section that contains said proximal end and a second section pivotably connected to said first section.

7. The screening apparatus of claims 6, wherein said arm includes a third section that contains said distal end of said arm, said third section is connected to said second section, and said console is rotatably connected to said distal end of said arm.

8. The screening apparatus of claim 1, including vibrating means in said screening chamber for imparting vibrating motion to the product.

9. The apparatus of claim 1, wherein said arm comprises a thermally insulating material.

10. The apparatus of claim 9, wherein said thermally insulating material includes titanium.

11. A screening apparatus for subjecting a product to varying environmental conditions, comprising:
    an enclosed screening chamber that is isolated environmentally from an ambient environment by top, bottom, and side walls;
    an entrance door opening located on one of said side walls;
    temperature control means for providing a unique temperature environment in said screening chamber;
    vibrating means in said screening chamber for imparting vibrating motion to the product;
    a console electrically connected to said screening chamber for supervising the screening apparatus; and
    an arm comprising thermally insulating material and having a proximal end and a distal end, wherein said proximal end is connected to said chamber, said arm extends outward from said screening chamber, and said distal end is connected to said console.

12. The screening apparatus of claim 11, wherein said arm includes a first section connected to said screening chamber and a second section pivotally connected to said first section.

13. The screening apparatus of claim 12, wherein said console is rotatably connected to said distal end of said arm.

14. The screening apparatus of claim 11, wherein said arm is hollow.

15. The screening apparatus of claim 11, wherein said proximal end of said arm is rigidly connected to said screening chamber.

16. The screening apparatus of claim 11, wherein said proximal end of said arm is pivotably connected to said screening chamber.

17. The screening apparatus of claim 11, wherein said screening chamber includes top surface and said proximal end of said arm is connected to said top surface of said screening chamber.

18. The screening apparatus of claim 17, wherein said arm includes a first section that contains said proximal end and a second section pivotably connected to said first section.

19. The screening apparatus of claim 18, wherein said arm includes a third section that contains said distal end of said arm, said third section is connected to said second section, and said console is rotably connected to said distal end of said arm.

20. The screening apparatus of claim 11, wherein said thermally insulating material comprises titanium.

21. An apparatus for attaching a console to an enclosed screening chamber, wherein said screening chamber is capable of subjecting a product or device positioned within the enclosed screening chamber to varying environmental conditions, comprising an arm having a distal end and a proximal end, said proximal end of said arm being unrotatably connected to the screening chamber such that arm extends outwardly from the screening chamber, and said distal end of said arm being rotatably connected to said console.

22. The apparatus of claim 21, wherein said arm comprises a thermally insulating material.

23. The apparatus of claim 22, wherein said thermally insulating material includes titanium.

24. The apparatus of claim 21, wherein said arm includes a first section and a second section pivotably connected to said first section, said proximal end of said arm is included in said first section, and said distal end of said arm is contained within said second section.

25. The apparatus of claim 21, wherein said arm is hollow.

26. The apparatus of claim 21, wherein said arm extends outwardly from the screening chamber such that the console is viewable from a plurality of sides of the screening chamber.

* * * * *